United States Patent [19]

Hall

[11] Patent Number: 4,691,621
[45] Date of Patent: Sep. 8, 1987

[54] PISTON-AND-CYLINDER ARRANGEMENT WITH RADIALLY-YIELDABLE PISTON HEAD

[75] Inventor: Larry D. Hall, East Aurora, N.Y.

[73] Assignee: Moog Inc., East Aurora, N.Y.

[21] Appl. No.: 869,591

[22] Filed: Jun. 2, 1986

[51] Int. Cl.[4] ............................................ F01B 31/00
[52] U.S. Cl. ...................................... 92/184; 92/175; 92/247
[58] Field of Search ...................... 92/184, 247, 181 R, 92/182, 201, 258, 175; 91/165

[56] References Cited

U.S. PATENT DOCUMENTS

| | | | |
|---|---|---|---|
| 680,465 | 8/1901 | Reynolds | 92/258 |
| 1,974,362 | 9/1934 | Marsh | 92/247 |
| 2,068,859 | 1/1937 | Jones | 92/258 |
| 2,460,948 | 2/1949 | Sander | 92/258 |
| 3,132,568 | 5/1964 | Strader | 92/184 |
| 3,207,426 | 9/1965 | Gassmann | 418/124 |
| 3,247,767 | 4/1966 | Aslan | 92/258 |
| 3,382,772 | 5/1968 | Kampert | 92/247 |
| 3,426,655 | 2/1969 | Rumsey | 92/184 |
| 3,785,253 | 1/1974 | Sandau | 92/258 |

*Primary Examiner*—Abraham Hershkovitz
*Attorney, Agent, or Firm*—Sommer & Sommer

[57] ABSTRACT

An improved piston-and-cylinder arrangement has a pressure-balanced piston head mounted on an actuator rod. The piston head is mounted for axial movement with the rod, and for radial movement relative thereto. Three annular ring-type seals are provided between facing cylindrical surfaces of the piston head and rod. The frictional impediment to radial movement of the piston head relative to the rod is minimized, and the improved device exhibits a reduction in the average maximum longitudinal frictional force per stroke.

23 Claims, 9 Drawing Figures

PISTON-AND-CYLINDER ARRANGEMENT WITH RADIALLY-YIELDABLE PISTON HEAD

BACKGROUND OF THE INVENTION

1. Field of the Invention

The present invention relates generally to the field of fluid-powered actuators, and, more particularly, to a piston-and-cylinder arrangement in which a radially-yieldable piston head may become axially tilted or cocked relative to an actuator rod in order to follow or track the bore of a cylinder.

2. Description of the Prior Art

Many forms of fluid-powered actuators have, of course, been developed heretofore. In a conventional piston-and-cylinder arrangement, a piston is mounted for sealed sliding movement along a cylinder bore. A first actuator rod may have a marginal end portion connected to the piston, and may have an intermediate portion extending away from the piston and penetrating an end wall of the cylinder. Often, a second rod is connected to the piston, and extends away from the piston in the opposite axial direction to penetrate the other end wall of the cylinder. The piston subdivides the cylinder into two opposing chambers, and has opposing faces arranged to face into these two chambers. The two piston faces may have the same cross-sectional area, or may have different areas. Pressurized fluid may be selectively admitted to, or withdrawn from, each chamber to exert a fluid force on the piston. Such force is a function of the area of the piston end face to which the fluid pressure is exposed, as well as the magnitude of that pressure.

In the case of an actuator having only one actuator rod connected to the piston, the areas of the opposing piston faces are normally unequal. The pressure in one chamber will act across the entire circular area of the piston. However, the pressure in the other chamber will act across the smaller-area opposite annular piston end face. These actuators are frequently formed such that the annular face of the piston has an area of about one-half of the opposite circular face. This means that, in equilibrium (i.e., in the absence of an external load), the pressure ($P_2$) in the annular chamber will be about twice the pressure ($P_1$) in the other chamber. Thus, even when the opposing fluidic forces acting on the piston are balanced (i.e., $P_1 A_1 = P_2 A_2$), a substantial pressure differential (i.e., $P_2 - P_1$) may exist across the piston.

In some applications, the cylinder is much elongated, and the actuator rod is designed to have a long stroke. The penetrant portion of the rod is typically supported by a bearing mounted on the cylinder end wall. As the rod is extended, the piston moves closer to this bearing, and the axial spacing between these two supports therefore decreases. If a load, whether externally applied or simply attributable to the weight of the extended rod, is not applied solely in an axial direction, such load will exert a force which urges the piston to tilt or cock relative to the cylinder. Such tilting or cocking increases the axial frictional force between the "relatively slidable" "piston and cylinder" surfaces, and causes unnecessary wear.

To prevent this from occurring, others have developed piston-and-cylinder arrangements having piston heads which "float" or move radially relative to an encircled portion of the actuator rod. For example, Sandau U.S. Pat. No. 3,785,253 discloses such a device in which a "floating" piston head is pressure-balanced, and therefore rendered insensitive to the magnitude of the fluid pressure (i.e., $P_1$, $P_2$) in either chamber and to any pressure differential (i.e., $P_2 - P_1$) across the piston head. However, Sandau pressure-balanced his "floating" piston head by providing four O-ring seals between various facing annular vertical surfaces which were arranged to move radially relative to one another. These face seals introduced substantial radial friction which impeded the ability of the piston head to "float" freely relative to the actuator rod. Other embodiments of prior art piston-and-cylinder arrangements are shown in U.S. Pat. Nos. 680,465 (Reynolds), 2,068,859 (Jones et al.), 2,460,948 (Sander), 3,207,426 (Gassman et al.), 3,247,767 (Aslan) and 3,556,538 (Muller).

SUMMARY OF THE INVENTION

With parenthetical reference to the preferred embodiment shown in FIGS. 3a and 3b, the invention provides an improved piston-and-cylinder arrangement (e.g., 101) having an annular piston head member (e.g., 104) encircling a portion (e.g., 21) of an actuator rod member (e.g., 11), the piston head member being mounted on the rod member portion for axial movement therewith and for radial movement relative thereto, the piston head member having one end face (e.g., 121) adapted to be exposed to a first fluid pressure (e.g., $P_1$) and having an opposite end face (e.g., 122) adapted to be exposed to a second fluid pressure (e.g., $P_2$).

The improvement broadly comprises: an annular recess (e.g., between surfaces 131',112',112,113) provided in one of the members (e.g., the actuator rod) to face the other of the members (e.g., the piston head), the one member having a first surface (e.g., 115') on one side of the recess, having a second surface (e.g., 112',112) within the recess, and having a third surface (e.g., 115) on the other side of the recess; an annular lug (e.g., between surfaces 125–130) provided on the other of the members and arranged in the recess, the other member having a first surface (e.g., 124) on one side of the lug arranged to face the one member first surface, having a second surface (e.g., 128) on the lug arranged to face the one member second surface, and having a third surface (e.g., 131) on the other side of the lug arranged to face the one member third surface; a first seal ring (e.g., 118) operatively arranged to seal the joint between the facing first surfaces; a second seal ring (e.g., 119) operatively arranged to seal the joint between the facing second surfaces; a third seal ring (e.g., 120) operatively arranged to seal the joint between the facing third surfaces; a first passageway (e.g., 139) communicating the annular space between the first and second seal rings with the piston head member one end face; and a second passageway (e.g., 138) communicating the annular space between the second and third seal rings with the piston member opposite end face. The facing first, second and third surfaces are so configured and dimensioned that a fluid pressure acting on either end face of said piston head member will not urge the piston head member to move axially relative to the rod member. Because the piston head member is pressure-balanced and there are no face seals, the frictional forces opposing radial movement of the piston head member relative to the rod member are substantially reduced.

Accordingly, the general object of this invention is to provide an improved piston-and-cylinder arrangement.

Another object is to provide an improved piston-and-cylinder arrangement in which a "floating" piston head is pressure-balanced, and therefore rendered insensitive to the pressure in either chamber, as well as the pressure differential across the piston head.

Still another object is to provide an improved piston-and-cylinder arrangement in which a pressure-balanced "floating" piston head may move freely in a radial direction relative to an encircled portion of an actuator rod.

These and other objects and advantages will become apparent from the foregoing and ongoing written specification, the drawings, and the appended claims.

BRIEF DESCRIPTION OF THE DRAWINGS

FIG. 1b is an enlarged detail view of the "floating" piston head shown in FIG. 1a.

FIG. 2b is an enlarged detail view of the "floating" piston head shown in FIG. 2a.

FIG. 3b is an enlarged detail view of the improved "floating" piston head shown in FIG. 3a.

DESCRIPTION OF THE PREFERRED EMBODIMENTS

Figure 1A:
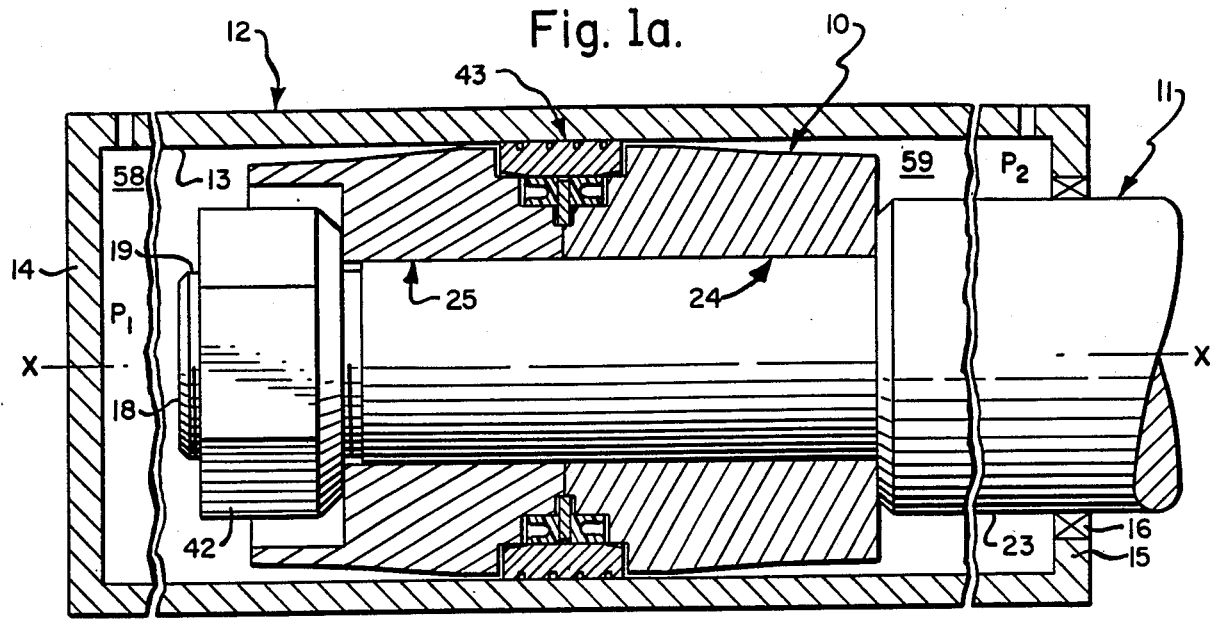
FIG. 1a is a fragmentary longitudinal vertical sectional view of a first earlier form of a piston-and-cylinder arrangement (not necessarily prior art) developed by Applicant, which had a "floating" piston head capable of radial movement relative to an H-shaped support mounted on the left marginal end portion of an actuator rod.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. The drawings are intended to be read (e.g., cross-hatching, arrangement of parts, etc.) together with the specification, and are to be considered a portion of the entire "written description" of this invention, as required by 35 U.S.C. §112. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Unless otherwise indicated, the terms "inwardly" and "outwardly" refer to the orientation of a surface relative to its axis of elongation, or axis of rotation, as appropriate.

Figure 3C:
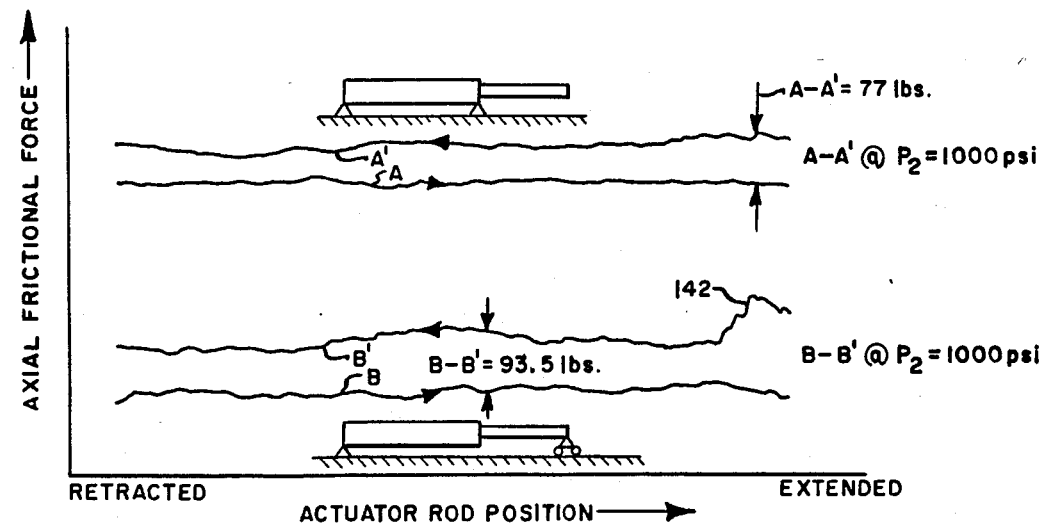
FIG. 3c is a graph of longitudinal frictional force vs. actuator rod position for the improved device shown in FIGS. 3a and 3b.
Figure 3A:
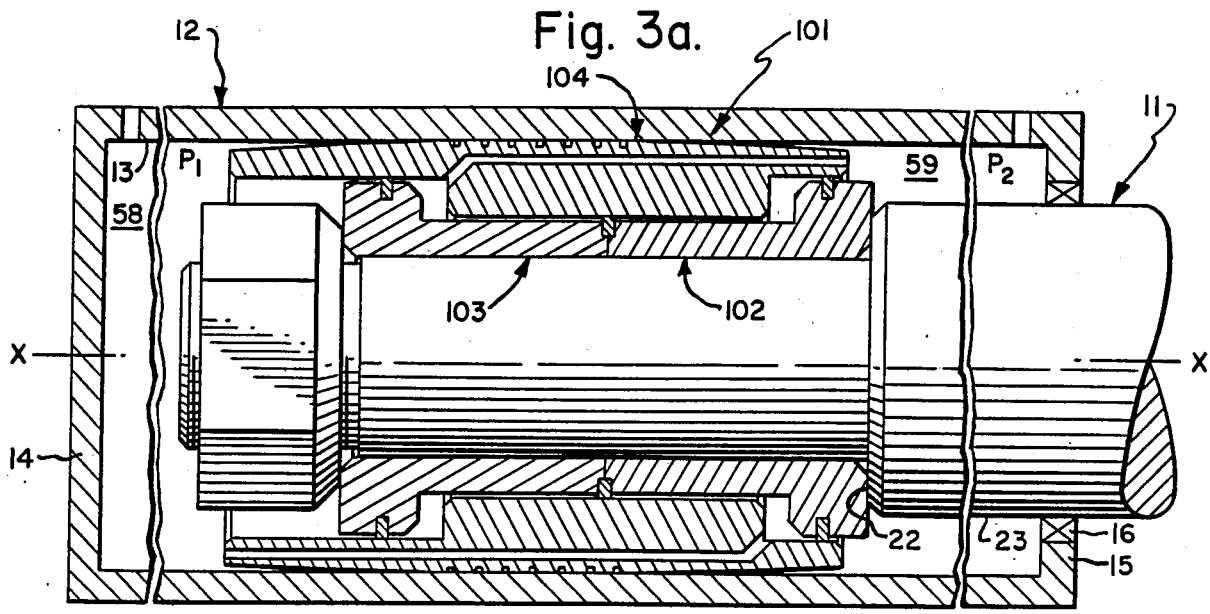
FIG. 3a is a fragmentary longitudinal vertical sectional view of an improved piston-and-cylinder arrangement having a pressure-balanced "floating" piston head mounted for radial movement relative to another form of H-shaped support mounted on the same marginal end portion of the actuator rod, this view also showing the three axially-spaced seal rings as radially engaging the various surfaces of the piston head.
Figure 3B:
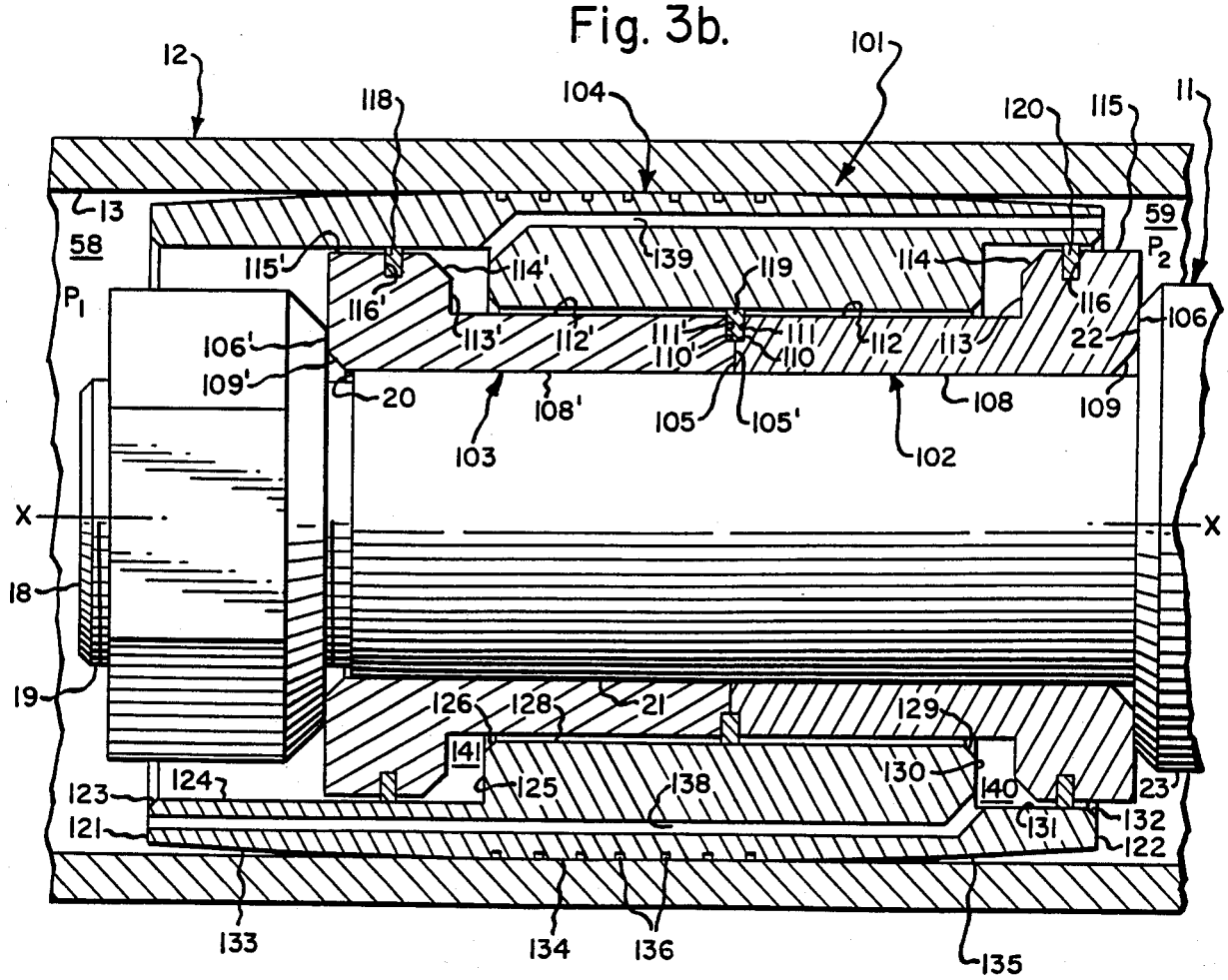

This invention broadly provides an improved piston-and-cylinder arrangement in which a pressure-balanced "floating" piston head is operatively mounted for relatively-free radial movement relative to an H-shaped supporting structure mounted fast to an actuator rod. The structure of the preferred embodiment is shown in FIGS. 3a and 3b, while its performance characteristics are shown in FIG. 3c.

However, before considering the structure and operation of the inventive device, it may be helpful to first review the structure and operation of two predecessor devices developed by Applicant. While both of these devices were developed prior to the improved device, neither earlier device necessarily constitutes an item of prior art.

Figure 1B:
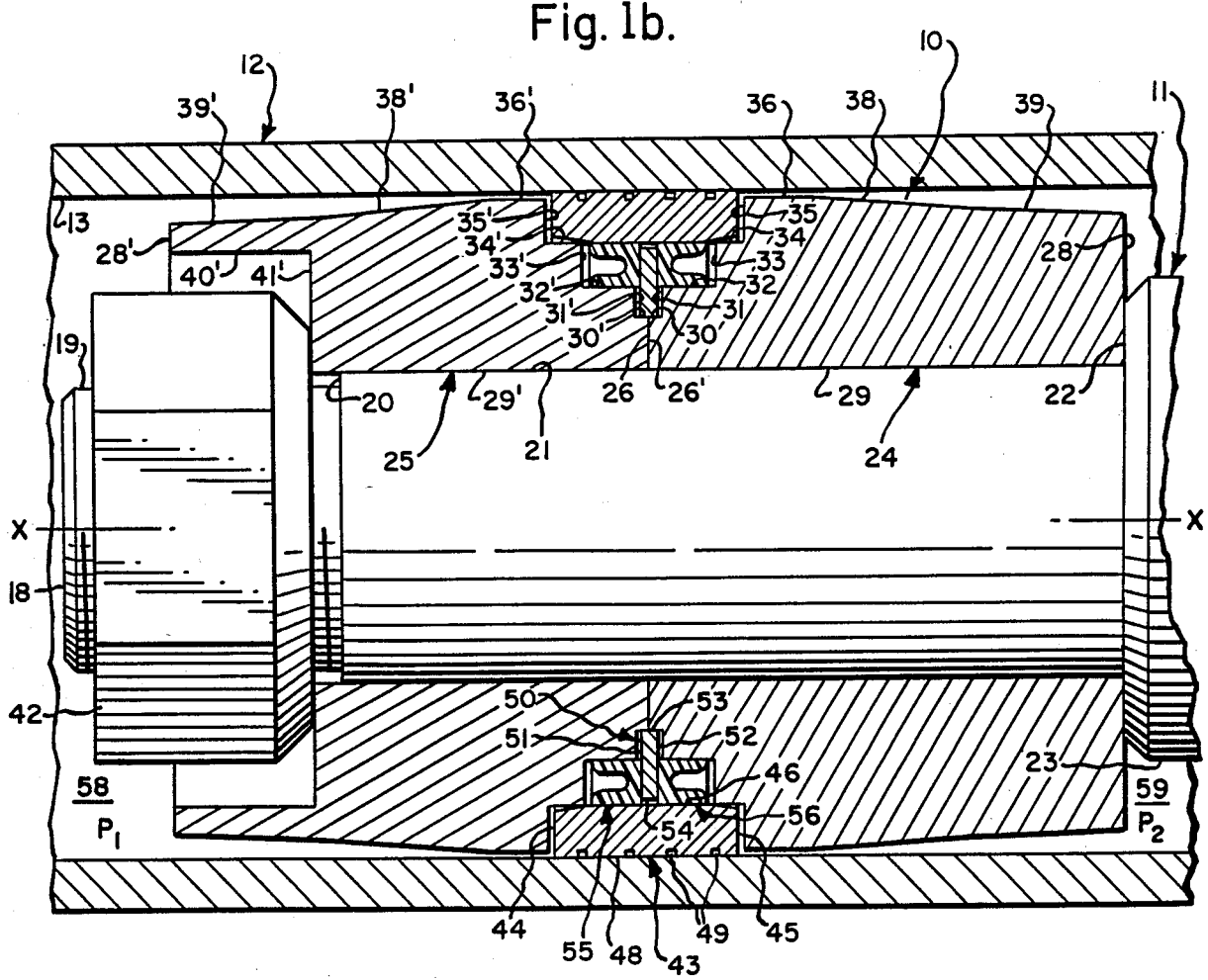
Figure 1C:
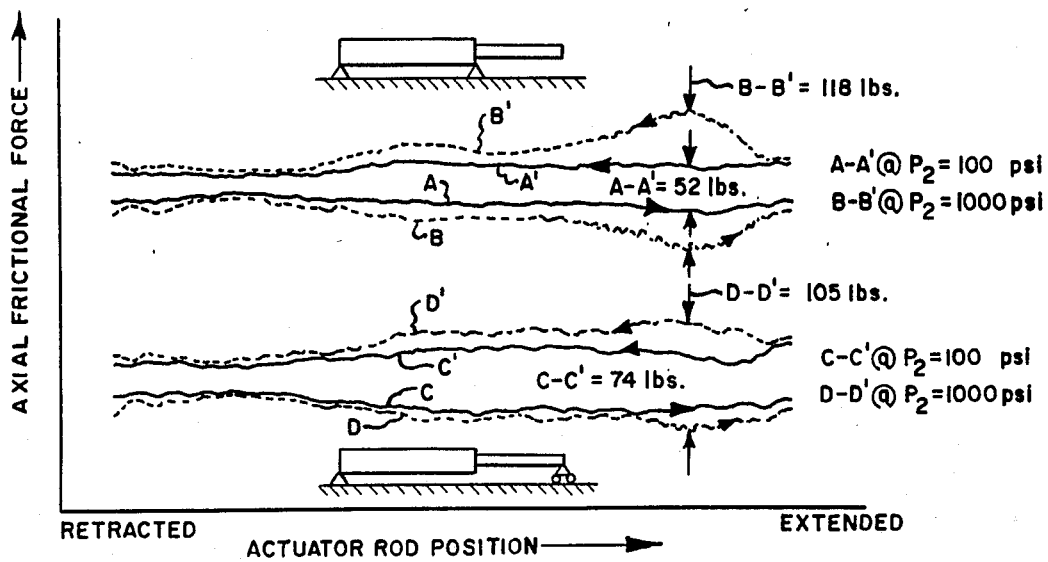
FIG. 1c is a graph of longitudinal frictional force vs. actuator rod position for the device shown in FIGS. 1a and 1b.

FIRST PREDECESSOR DEVICE (FIGS. 1a–1c)

Referring now to FIG. 1a, a first earlier form of a piston-and-cylinder arrangement having a radially-yieldable piston head, is generally indicated at 10.

Device 10 was mounted on the left marginal end portion of an actuator rod 11 for movement therewith along an enclosed cylinder 12 having an inwardly-facing cylinderical surface 13 generated about a horizontal axis x—x. Cylinder 12 had a circular vertical left end wall 14, and had an annular vertical right end wall 15 provided with a bearing 16 through which a penetrant portion of rod 11 passed.

The actuator rod 11 had a circular vertical left face 18, and had a stepped outer surface which included, in pertinent part (from left to right in FIG. 1a): an externally-threaded portion 19 extending rightwardly from left face 18, a leftwardly-facing annular vertical surface 20, an outwardly-facing horizontal cylindrical surface 21, a leftwardly-facing annular vertical shoulder surface 22, and an outwardly-facing horizontal cylindrical surface 23 continuing rightwardly therefrom and slidably penetrating the bearing 16 in the cylinder right end wall.

A two-piece annular support, including right part 24 and left part 25, was mounted on the actuator rod so as to encircle cylindrical surface 21. The support right part 24 had an annular vertical left face 26; had an annular vertical right face 28 arranged to abut rod shoulder 22; and had an inwardly-facing horizontal cylindrical surface 29 arranged to face a portion of rod surface 21. The outer surface of the support right part was sequentially bounded by (from left to right in FIG. 1a): an outwardly-facing horizontal cylindrical surface 30 extending rightwardly from left end face 26, a leftwardly-facing annular vertical surface 31, an outwardly-facing horizontal cylindrical surface 32, a leftwardly-facing annular vertical surface 33, an outwardly-facing horizontal cylindrical surface 34, a leftwardly-facing annular vertical surface 35, an outwardly-facing horizontal cylindrical surface 36 arranged in spaced facing relation to cylinder bore 13, a first slightly-tapered outwardly- and rightwardly-facing frusto-conical surface 38, and another less-tapered outwardly- and rightwardly-facing frusto-conical surface 39 containing rightwardly therefrom to join right end face 28.

The support left part was structurally similar to that of the right part, except that it was mounted on the actuator rod as a mirror image of the right part. Hence, the primes of the same reference numerals have been used to identify the corresponding surfaces of the support left part. Thus, left part right end face 26' was arranged to abut right part left end face 26. Moreover, a large diameter recess, bounded by inwardly-facing horizontal cylindrical surface 40' and leftwardly-facing annular vertical surface 41', extended into the support left part from its left face, to receive and accommodate a nut 42 threaded onto the actuator threaded portion 19. Nut 42 was suitably tightened to rigidly mount the support left and right parts to the actuator rod.

An annular piston head 43 was mounted on the assembled left and right support parts. Specifically, this piston head had annular vertical left and right faces 44,45 arranged to face left and right part surfaces 35',35, respectively; had an inwardly-facing substantially-horizontal cylinderical surface 46 arranged to face support surfaces 34',32',32,34; and had an outwardly-facing horizontal cylindrical surface 48 arranged to slidably engage cylinder bore 13. Piston outer surface 48 was ground to closely approximate the diameter of bore surface 13. A plurality of axially-spaced annular grooves, severally indicated at 49, extended radially into the piston head from its outer surface 48 to provide a fluid-tight laminar sliding seal with cylinder bore 13. The axial spacing between support surfaces 35,35' was on the order of 0.002 inches greater than the axial length of the piston head between end faces 44,45. The radial spacing between support surfaces 34,34' and piston surface 46 was about 0.020 inches. Hence, the piston head was free to move radially relative to the assembled support.

An annular ring 50 was loosely positioned between support surfaces 31,31'. Specifically, this ring had annular vertical left and right faces 51,52, respectively, and inner and outer horizontal cylindrical surfaces 53,54, respectively. Ring 50 could move both radially and axially relative to the assembled support, and functioned to separate a pair of leftwardly- and rightwardly-facing cup seals 55,56, respectively, which sealed the piston head to the two support parts.

However, piston head 43 was not pressure-balanced. Hence, the pressure $P_1$ in the cylinder chamber 58 to the left of the piston, would act against piston head left end face 44, while the pressure $P_2$ in the annular cylinder chamber 59 to the right of the piston, would act against piston head right end face 45. This actuator was formed with a substantially 2:1 area ratio between the area across which these pressures acted. In other words, the effective area of the assembled piston which faced into left chamber 58 was about twice the effective annular area facing into right chamber 59. Hence, the right chamber pressure $P_2$ had to be about twice the left chamber pressure $P_1$ for the opposing fluidic forces acting on the piston-rod assembly to balance one another. An electrohydraulic servovalve (not shown) was used to control the pressures in chambers 58,59. The supply pressure ($P_s$) was supplied to right chamber 59. Thus, if the supply pressure was 100 psi, $P_2$ would be 100 psi, and $P_1$ would be about 50 psi in equilibrium. However, if the supply pressure was 1000 psi, $P_2$ would be 1000 psi, while $P_1$ would be 500 psi in equilibrium.

The piston head end faces 44,45 had the same area. Hence, a 500 psi pressure differential (i.e., $P_2-P_1=1000$ psi $-500$ psi $=500$ psi) across the piston head would drive the piston head leftwardly to hard abut support left part surface 35'. This exerted a substantial normal force between contacting surfaces 44,35', and, concomitantly, created a substantial frictional force (i.e., $F=\mu N$, where F=frictional force, $\mu$=coefficient of friction, and N=normal force) which tended to restrain or inhibit free radial movement of the piston head relative to the assembled support.

Applicant's test experience with this device is shown in FIG. 1c. In the upper portion of FIG. 1c, there are two separate plots showing the results when the ends of the cylinder were simply supported, and a pressure differential was provided to chambers 58,59 to slowly extend and retract the actuator rod in the manner of a cantilever, as indicated in the accompanying schematic. The longitudinal frictional force was measured by measuring the actual pressure differential as a departure from the calculated equilibrium differential. In other words, if the area relationship was 2:1, and $P_s=P_2=1000$ psi, then $P_1=500$ psi in equilibrium. However, if $P_1$ was, say, 502 psi and $P_2$ was, say, 998 psi, then the departure from the calculated equilibrium differential was $(1000-998)-(500-502)=4$ psi. This amount, multiplied by the area across which it acted, was calculated to be the longitudinal frictional force of the actuator.

The curve labeled A indicates the magnitude of the longitudinal frictional force as a function of rod postion, as the actuator rod was slowly extended from its retracted position when the supply pressure provided to chamber 59 was 100 psi (i.e., at a nominal equilibrium pressure differential of about 50 psi). The curve labeled A' represents the return stroke at $P_2=100$ psi, during which the rod was retracted from its extended position. Curves A—A' indicate a maximum frictional force differential of approximately 52 pounds between the extension and retraction strokes, for an average maximum of about 26 pounds on either stroke. The curves marked B—B' were obtained when the supply pressure provided to chamber 59 was 1000 psi (i.e., at a nominal equilibrium pressure differential of approximately 500 psi). Curve B was obtained when the actuator rod was slowly extended from its retracted position, and companion curve B' was obtained during its return stroke. Curve B—B' indicates a maximum frictional force differential of about 118 pounds, for an average maximum of approximately 59 pounds on either stroke. The amount of friction attributable to thrust bearing 16 was found to average about 17.5 pounds per stroke. This was determined by measuring the force needed to slowly displace the actuator rod through bearing 16 when the piston head was removed and in the absence of any fluid pressure.

In the lower portion of FIG. 1c, the distal ends of the cylinder and the rod were supported, with the rod end being mounted on movable rollers, as indicated in the accompanying schematic. Hence, in this configuration, the weight of the cylinder constituted an additional force urging the piston head to cock or tilt relative to the actuator rod. The curve labeled C was obtained when the rod was slowly extended from its retracted position, while the curve labeled C' was obtained during the return stroke. Curves C—C' were obtained when $P_2=P_s=100$ psi (i.e., at a nominal equilibrium pressure differential of approximately 50 psi). The curve labeled D was obtained when the actuator rod was slowly extended when $P_2=P_s=1000$ psi (i.e., at a nominal pressure differential of about 500 psi), while the curve D' was obtained during the return stroke at this same pressure. Curves C—C' indicate a maximum frictional force differential therebetween of approximately 74 pounds, for an average maximum of approximately 37 pounds on either stroke. On the other hand, the curves D—D' indicate a maximum frictional force differential of approximately 105 pounds, for an average maximum of approximately 52.5 pounds on either stroke.

Thus, the data shown in FIG. 1c indicates that the differential between pressures $P_2$ and $P_1$ is a significant factor influencing the amount of longitudinal frictional force. In other words, while the device performed reasonably well at a relatively low nominal differential pressure (i.e., $P_2-P_1=50$ psi), at a higher nominal pressure differential (i.e., $P_2-P_1=500$ psi) across the piston head, the corresponding frictional forces increased significantly.

Figure 2C:
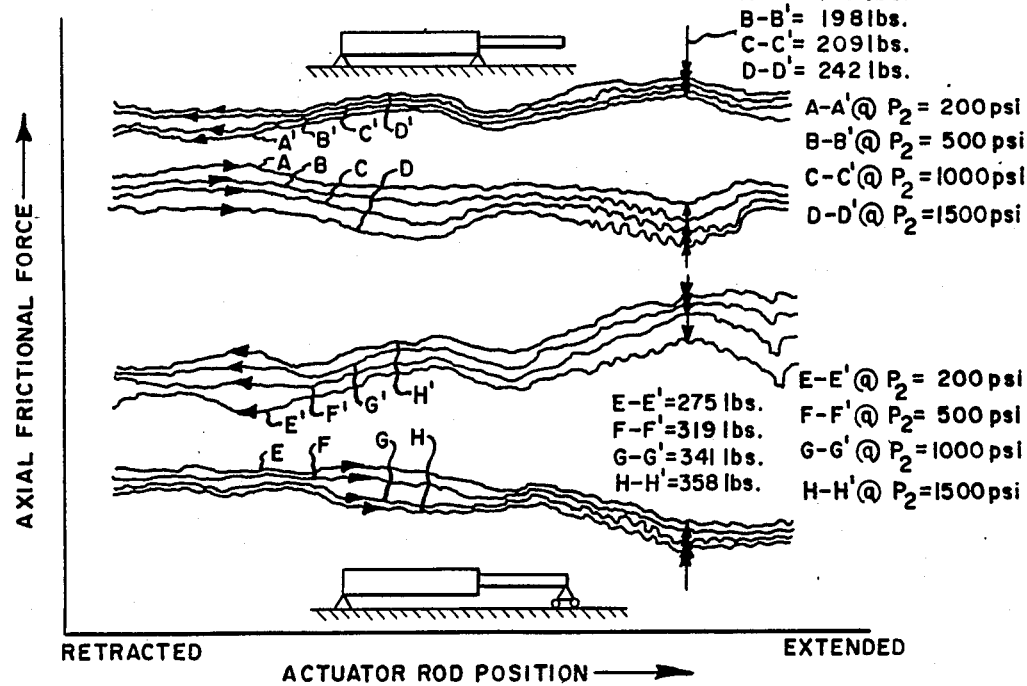
FIG. 2c is a graph of longitudinal frictional force vs. actuator rod position for the device shown in FIGS. 2a and 2b.
Figure 2A:
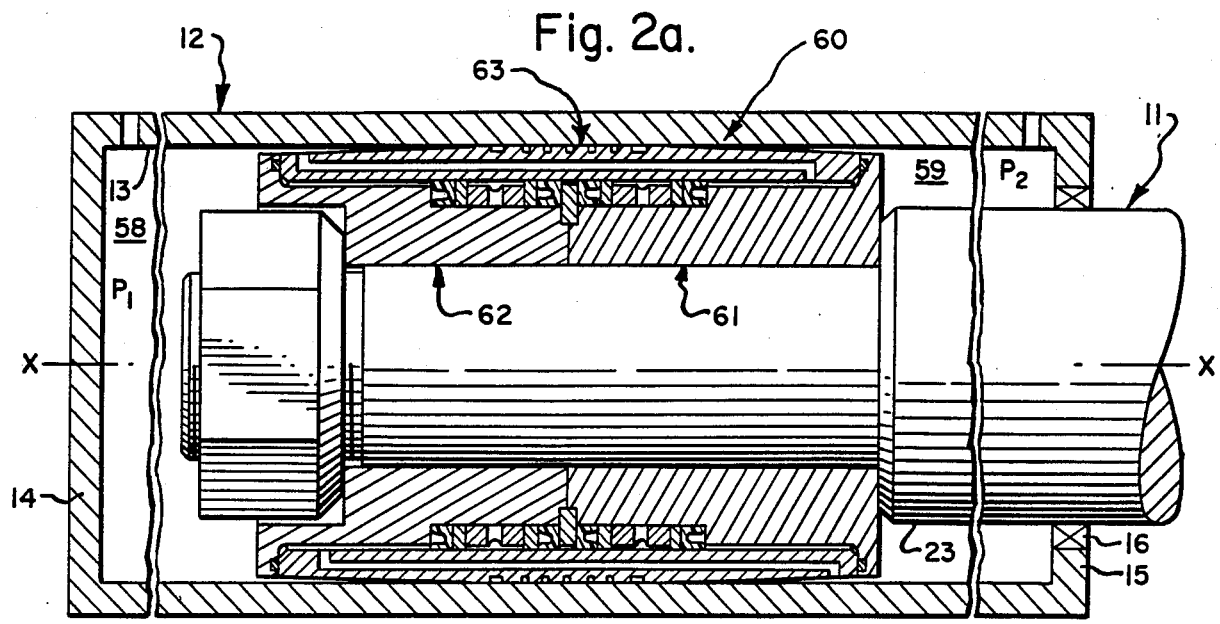
FIG. 2a is a fragmentary longitudinal vertical sectional view of a second earlier form of a piston-and-cylinder arrangement (not necessarily prior art) developed by Applicant, which was intended to have a pressure-balanced "floating" piston head capable of radial movement relative to a variant H-shaped support mounted on the same marginal end portion of the actuator rod, this view also showing the use of elastomeric face seals between the piston head and the support.
Figure 2B:
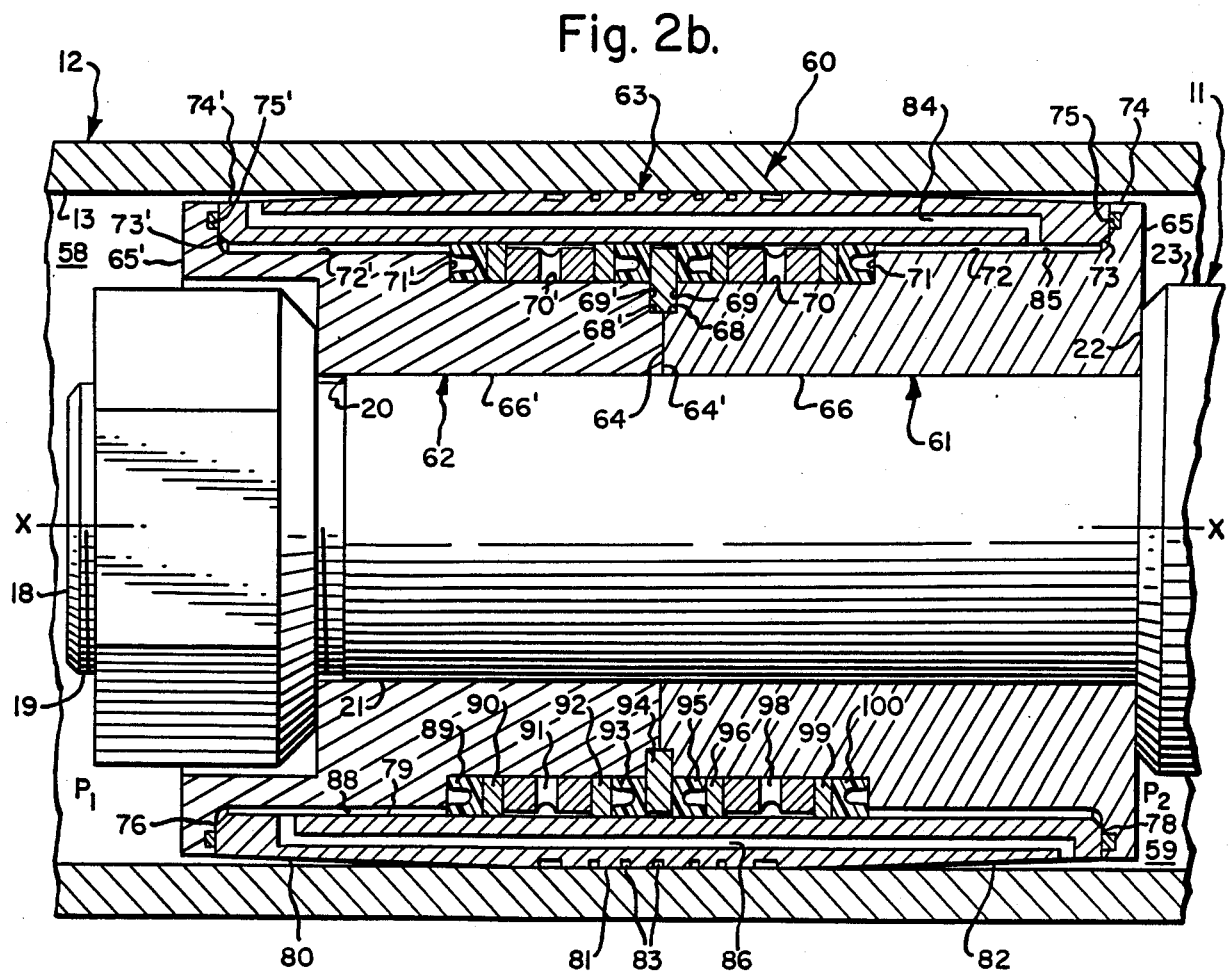

SECOND PREDECESSOR DEVICE (FIGS. 2a-2c)

The second device shown in FIGS. 2a and 2b was developed in an attempt to improve upon the performance of the first device. Since the magnitude of the frictional force appeared to increase with the magnitude of the pressure differential (i.e., $P_2-P_1$) across the piston head in the first device, it was thought that the piston head could be pressure-balanced to prevent the piston head from being driven hard against the support and to permit the piston head to move more freely in a radial direction relative to the support. Thus, the piston head and support of the first embodiment were removed from the actuator rod, and a second device, shown in FIGS. 2a and 2b, was substituted therefor. The actuator rod 11 and cylinder 12 remained the same.

Referring now to FIGS. 2a and 2b, this second device, generally indicated at 60, broadly included a two-piece support having a right part 61 and a left part 62, and also included an annular piston head encircling the two support parts.

In this embodiment, the support left and right parts were structurally identical, although arranged as a mirror image of one another. Hence, only the support right part will be explicitedly described, with the primes of the same reference numerals being again used to identify the corresponding surfaces of the support left part 62.

The support right part 61 had annular vertical left and right end faces 64, 65; had a horizontal through-bore bounded by inwardly-facing cylindrical surface 66 encircling rod surface 21; and had a stepped outer surface which sequentially included (from left to right in FIGS. 2a and 2b): an outwardly-facing horizontal cylindrical surface 68 extending rightwardly from left end face 64, a leftwardly-facing annular vertical surface 69, an outwardly-facing horizontal cylindrical surface 70, a leftwardly-facing annular vertical surface 71, an outwardly-facing horizontal cylinrical surface 72, a leftwardly-facing annular vertical surface 73, and an outwardly-facing horizontal cylindrical surface 74 continuing rightwardly therefrom to join right end face 65. An annular groove extended rightwardly into the support right part from surface 73 to receive and accommodate an elastomeric O-ring 75, which engaged the facing surface of the piston head.

The support right part 61 was slipped over rod surface 21 such that right part end face 65 abutted rod shoulder 22. The support left part was positioned as a mirror image of right part 61, and was also slipped over rod surface 21 such that its right end face 64' abutted right part left end face 64. Thereafter, nut 42 was threaded onto rod threaded portion 19, and was suitably tightened to rigidly mount the two support parts 61,62 on the left marginal end portion of the actuator rod.

The piston head 63 was a specially-configured tubular member, also generated about cylinder axis x—x. Specifically, the piston head had annular vertical left and right end faces 76,78 arranged to face support surfaces 73',73, respectively; had a through-bore bounded by inwardly-facing horizontal cylindrical surface 79 arranged in spaced facing relation to support surfaces 72,72'; and had a somewhat-domed outer surface which sequentially included a leftwardly- and outwardly-facing frusto-conical surface 80 extending rightwardly from left end face 76, an intermediate outwardly-facing horizontal cylindrical surface 81 arranged to slidably engage bore surface 13, and a rightwardly- and outwardly-facing frusto-conical surface 82 continuing rightwardly therefrom to join right end face 78. The piston head left and right end faces 76,78, were compressively engaged by O-rings 75',75. Piston head outer surface 81 was provided with a plurality of axially-spaced radially-extending annular grooves, severally indicated at 83, to provide a fluid-tight laminar sliding seal between the piston head and the cylinder bore. The piston head was provided with a first internal passageway 84 which communicated the pressure $P_1$ in left chamber 58 with an annular right chamber 85 formed between facing surfaces 72,79, and was also provided with a second internal passageway 86 which communicated the pressure $P_2$ in right chamber 59 with an annular left chamber 88 formed between facing surfaces 72',79.

These two internal chambers 85,88 were sealingly separated by an elaborate annular seal assembly which sequentially included (from left to right in FIGS. 2a and 2b): a leftwardly-facing cup seal 89, a back-up ring 90, a separator sleeve 91, a back-up ring 92, a leftwardly-facing cup seal 93, a central seal separator ring 94 loosely held between surface 69',69, a rightwardly-facing cup seal 95, a back-up ring 96, a separator sleeve 98, a back-up ring 99, and a rightwardly-facing cup seal 100. This seal assembly functioned to sealingly separate chambers 85,88, while simultaneously permitting radial movement of the piston head relative to the support. The nominal radial play between the piston head and the support was about 0.020 inches. Piston head surface 81 was dimensioned so as to have substantially the same area and radial clearance with bore surface 13, as in the first embodiment.

The grooves in which O-rings 75,75' were received, were positioned accurately so that the various opposing fluid forces acting on the piston head in the axial direction would be balanced. Pressure $P_1$ in left chamber 58 exerted a rightward force on a leftwardly-facing projected area ($A_1$) of the piston head between left seal 75' and piston surface 81. However, pressure $P_1$ also existed in right chamber 85 and exerted a leftward force on the annular area ($A_2$) of the piston head right face 78 between right seal 75 and piston inner surface 79. Conversely, the pressure $P_2$ in right chamber 59 exerted a leftward force on the rightwardly-facing projected area ($A_3$) of the piston head right face between surface 81 and right seal 75. However, pressure $P_2$ also existed in left chamber 88, and exerted a rightward force on the piston head left end face between left seal 75' and piston inner surface 79. The O-ring grooves were positioned such that the opposing areas over which like pressures acted, were equal to one another. In other words, $A_1 = A_2$ and $A_3 = A_4$. Hence, the piston head was balanced against any pressure differential (i.e., $P_2 - P_1$) thereacross. In other words, whereas the first embodiment shown in FIGS. 1a and 1b had demonstrated a sensitivity to the magnitude of a pressure differential across the piston head (as shown by the differences between curves A—A' and B—B', and between curves C—C' and D—D' in FIG. 1c), this second device sought to render the piston head insensitive to such pressure differentials.

Applicant's test experience with this device is graphically illustrated in FIG. 2c. In the upper portion of FIG. 2c, there are four separate curves showing the longitudinal frictional forces measured when the cylinder was simply supported at its ends and the rod was slowly extended (i.e., in the direction of the rightward arrows) and thereafter slowly retracted (i.e., in the direction of the leftward arrows) at various nominal equilibrium pressure differentials across the piston head. The curves A, B, C and D were obtained when the actuator rod was slowly extended at nominal pressure differentials (i.e., $P_2 - P_1$) of 100 psi, 250 psi, 500 psi and 750 psi, respectively. Companion curves A', B', C' and D' were obtained when the rod was slowly retracted at these same respective differential pressures.

At a nominal pressure differential of about 100 psi, curves A—A' indicate a maximum frictional force of about 176 pounds therebetween, for an average of about 88 pounds on either stroke. At a nominal pressure differential of about 250 psi, curves B—B' indicate a maximum frictional force of about 198 pounds therebetween, for an average of about 99 pounds on either stroke. At a pressure differential of about 500 psi, curves C—C' indicate a maximum frictional force of about 209 pounds therebetween, for an average of about 104.5 pounds on either stroke. Finally, at a pressure differential of about 750 psi, curves D—D' indicate a maximum frictional force of about 242 pounds therebetween, for an average of about 121 pounds on either stroke.

Referring now to the group of curves labeled E—E', F—F', G—G' and H—H' in the lower portion of FIG. 2c, these were obtained when the distal ends of the cylinder and the actuator rod were simply supported. The support beneath the actuator rod was again mounted on rollers, as indicated in the accompanying schematic. Curves E, F, G and H were obtained by slowly extending the rod when the nominal pressure differential across the piston head was about 100 psi, 250 psi, 500 psi and 750 psi, respectively. Companion curves E', F', G' and H' were obtained when the actuator rod was again retracted at these same respective nominal pressure differentials.

At a nominal pressure differential of about 100 psi, curves E—E' indicate a maximum frictional force of about 275 pounds therebetween, for an average maximum of about 137.5 pounds on either stroke. At a nominal pressure differential of about 250 psi, curves F—F' indicate a maximum frictional force of about 319.0 pounds therebetween, for an average maximum of about 159.5 pounds on either stroke. At a nominal pressure differential of about 500 psi, curves G—G' indicate a maximum frictional force of about 341 pounds therebetween, for an average maximum of about 170.5 pounds on either stroke. At a pressure differential of about 750 psi, curves H—H' indicate a maximum frictional force of about 358 pounds therebetween, for an average maximum of about 179 pounds on either stroke.

Thus, whereas the original intent of the second embodiment had been to pressure-balance the piston head so as to hopefully reduce the amount of friction, particularly as a function of the nominal pressure differential across the piston head, the data shown in FIG. 2c illustrates that the performance of this second embodiment was worse than the performance of the first embodiment. For example, for a nominal pressure differential of about 500 psi, the average maximum frictional force between curves B—B' in FIG. 1c was approximately 59 pounds on either stroke when the cylinder was simply supported. In a corresponding test, curves C—C' in FIG. 2c (again at a nominal pressure differential of about 500 psi) indicated an average maximum force of about 104.5 pounds on either stroke. When the distal ends of the cylinder and rod were simply supported, and the nominal pressure differential across the piston head was approximately 500 psi, FIG. 1c indicated that the first embodiment (i.e., between curves D—D') had an average maximum frictional force of about 52.5 pounds on either stroke, whereas similar curves G—G' in FIG. 2c indicated an average maximum frictional force of about 170.5 pounds on either stroke. Thus, when the cylinder was simply supported, the average maximum frictional force of the second embodiment was found to be approximately $59/104.5 = 177\%$ of the corresponding maximum frictional force in the first embodiment at the same nominal pressure differential across the piston head. When the cylinder and rod ends were simply supported, the average maximum frictional force of the second embodiment was found to be $170.5/52.5 = 324.8\%$ greater than the average maximum frictional force in the first embodiment, again at the same nominal pressure differential. Thus, Applicant's data indicated that the frictional force in the second embodiment was substantially increased, despite the fact that its piston head was pressure-balanced. In hindsight, it is now believed that, while the piston head itself was balanced, the elastomeric seals 75,75' (which had to be compressed on the order of 20% to insure their fluid-tight sealing integrity) introduced a substantial impediment to the freedom of the piston head to move radially relative to the rod. Thus, what was sought to be gained by pressure-balancing the piston head, was lost by providing face seals, which frictionally engaged the opposing end faces of the piston head.

THE IMPROVED DEVICE (FIGS. 3a-3c)

Referring now to FIGS. 3a and 3b, the improved device, generally indicated at 101, was developed in a further attempt to better the performance of the devices shown in FIGS. 1a-1b and FIGS. 2a-2b. The same cylinder 12 and actuator rod 11 were again used in this third device. Hence, the same reference numerals have again been used in FIGS. 3a and 3b to indicate the previously-described structure of such cylinder and rod.

The improved device 101 again broadly included a two-piece support including a right part 102 and a left part 103, and included a tubular piston head 104 encircling the assembled support for radial movement relative thereto.

The support right part had an annular vertical left end face 105, had an annular vertical right end face 106, and had a horizontal through-bore which sequentially included and inwardly-facing horizontal cylindrical surface 108 extending rightwardly from left end face 105, and a rightwardly- and inwardly-facing frusto-conical surface 109 continuing rightwardly therefrom to join right end face 106. The outer surface of the right part sequentially included (from left to right in FIG. 3b): an outwardly-facing horizontal cylindrical surface 110, a leftwardly-facing annular vertical surface 111, an outwardly-facing horizontal cylindrical surface 112, a leftwardly-facing annular vertical surface 113, an outwardly- and leftwardly-facing frusto-conical surface 114, and an outwardly-facing horizontal cylindrical surface 115 continuing rightwardly therefrom to join right end face 106. An annular groove extended radially into right part 102 from surface 115.

The support right part 102 was slipped over rod surface 21 such that support right end face 106 abutted rod shoulder 22. The support left part 103 was structurally identical to right part 102, although mounted on the actuator rod as a mirror image of the right part. Hence, consistent with the previous convention, the primes of the same reference numerals have again been used to identify the corresponding surfaces of the support left part. Since its position was reversed end-for-end, the left part was slipped over the rod portion 21 such that its right end face 105' abutted the left end face 105 of the right part. Thereafter, nut 42 was suitably threaded on to the rod threaded portion, and was selectively tightened to rigidly mount the assembled support on the left marginal end portion of the actuator rod.

A leftward or first seal ring 118 was arranged in left groove 116', a middle or second seal ring 119 was arranged in the middle groove defined by surfaces 111, 110,110',111', and a rightward or third seal ring 120 was arranged in right groove 116.

Piston head 104 was a specially-configured tubular member having an annular lug extending radially inwardly so as to be received between support surfaces 113,113'. Specifically, this piston head had an annular vertical left end face 121; had an annular vertical right end face 122; and had an axial through-bore which was sequentially bounded by (from left to right in FIGS. 3a and 3b): a leftwardly- and inwardly-facing frusto-conical surface 123 extending rightwardly from left end face 121, an inwardly-facing horizontal cylindrical surface 124, a leftwardly-facing annular vertical surface 125, a leftwardly- and inwardly-facing frusto-conical surface 126, an inwardly-facing horizontal cylindrical surface 128, an inwardly- and rightwardly-facing frusto-conical surface 129, a rightwardly-facing annular vertical surface 130, an inwardly-facing horizontal cylindrical surface 131, and an inwardly- and rightwardly-facing frusto-conical surface 132 continuing rightwardly therefrom to join right end face 122. The inwardly-extending lug of the piston head was defined by surfaces 125–130. The piston head outer surface was somewhat domed, and sequentially included (from left to right in FIGS. 3a and 3b): a slightly-tapered leftwardly- and outwardly-facing frusto-conical surface 133 extending rightwardly from left end face 121, a central outwardly-facing horizontal cylindrical surface 134 arranged to slidably engage bore surface 13, and a slightly-tapered rightwardly- and outwardly-facing frusto-conical surface 135 continuing rightwardly therefrom to join right end face 122. A plurality of axially-spaced annular grooves, severally indicated at 136, extended radially into the piston head from surface 134 to provide a fluid-tight laminar sliding seal between surfaces 134,13. A first internal passageway 138 extended from left face 121 to the intersection of surfaces 130,131. Conversely, a second internal passageway 139 extended from right face 122 to the intersection of surfaces 124,125. Thus, the pressure $P_1$ in left chamber 58 also existed in passageway 138 and in the annular right chamber 140 defined by facing surfaces 112–115 and 128–131 between seals 119,120; while the pressure $P_2$ in right chamber 59 also existed in passageway 139 and in the annular left chamber 141 defined by facing surfaces 112'–115° and 124–128 between seals 118,119.

The piston head was carefully dimensioned such that the leftwardly-facing projected annular vertical area ($A_1$) between surfaces 124,134 was equal to the rightwardly-facing projected annular vertical area ($A_2$) between surfaces 128,131. Conversely, the rightwardly-facing annular vertical area ($A_3$) between surfaces 131,134 was equal to the leftwardly-facing projected annular vertical area ($A_4$) between surfaces 124,128. Hence, if outer surface 134 had a diameter of $D_3$, and inner surface 128 had a diameter of $D_1$, then the diameter $D_2$ of each of surfaces 124,131 could be easily calculated according to the equation:

$$D_2^2 = (D_3^2 + D_1^2)/2$$

Thus, the piston head 104 was pressure-balanced and was therefore insensitive to the magnitude of any pressure differential (i.e., $P_2-P_1$) between chambers 59,58. However, in this improved design, there were no elastomeric face seals between the facing surfaces of the support and piston head which were arranged to move radially relative to one another. Piston head surface 134 was again dimensioned to have substantially the same area and radial clearance as in the two earlier embodiments.

The performance of the improved device is graphically illustrated in FIG. 3c. Curves A—A' were obtained at a nominal pressure differential (i.e., $P_2-P_1$) of about 500 psi, when the ends of the cylinder were simply supported. Curve A was obtained when the rod was slowly extended, while companion curve A' was obtained when the rod was slowly retracted, in the direction of the indicated arrow heads. The maximum differential force between curves A—A' was about 77 pounds, for an average maximum of about 38.50 pounds per stroke. Notice also that curves A—A' are substantially horizontal, which indicates that the average frictional force was substantially constant and substantially independent of actuator rod position.

The lower curves B—B' were obtained at the same nominal pressure differential (i.e., $P_2-P_1=500$ psi) across the piston head, when the distal ends of the cylinder and rod were simply supported. Here again, the support beneath the rod end was mounted on rollers. Curve B was obtained when the rod was slowly extended, while companion curve B' was obtained when the rod was slowly retracted. Note again that curves B—B' are substantially horizontal, except for a glitch, indicated at 142, on curve B'. This glitch was attributable to a failure of bearing 16. Ignoring this, curves B—B' indicated a maximum frictional force therebetween of about 93.5 pounds, for an average maximum of about 46.75 pounds per stroke. The fact that curves B—B' are substantially horizontal again indicates that the average frictional force per stroke was substantially constant, and was substantially independent of the rod position relative to the cylinder.

The performance of the improved device may be compared with the performance of the two predecessor devices for like nominal pressure differentials (i.e., $P_2 - P_1 = 500$ psi) across the piston head, as summarized herebelow:

| Device | $P_2 - P_1$ | Avg. Maximum Frictional Force/Stroke | |
|---|---|---|---|
| | | Cylinder Supported | Cylinder and Rod End Supported |
| FIGS. 1a & 1b | 500 psi | 59 (B-B' in 1c) | 52.5 lbs. (D-D' in 1c) |
| FIGS. 2a & 2b | 500 psi | 104.5 (C-C' in 2c) | 170.5 lbs. (G-G' in 2c) |
| FIGS. 3a & 3b | 500 psi | 38.50 (A-A' in 3c) | 46.75 lbs. (B-B' in 3c) |

It is not believed possible to totally eliminate such frictional forces, for there will always be some frictional force between bearing 16 and rod surface 23, and between the portion of the piston head which slidably engages the cylinder bore. Hence, while some friction will always be present, the friction attributable to these relatively sliding surfaces should be substantially constant so long as the piston head does not tilt or cock relative to the cylinder bore. When Applicant's data is compared for similar tests at like nominal pressure differentials (i.e., $P_2 - P_1$) across the piston head, it may be seen that when the cylinder was simply supported, the average maximum frictional force per stroke of the improved device was about $38.50/59 = 65.25\%$ of that measured for the first predecessor device shown in FIGS. 1a and 1b, and only about $38.50/104.5 = 36.85\%$ of that measured for the second predecessor device shown in FIGS. 2a and 2b. When the distal ends of the cylinder and rod were simply supported, the average maximum frictional force per stroke of the improved device was found to be about $46.75/52.5 = 89\%$ of that measured for the first predecessor device shown in FIGS. 1a and 1b, but only about $46.75/170.5 = 27.42\%$ of that measured for the second predecessor device shown in FIGS. 2a and 2b.

The substantially-improved performance of the device shown in FIGS. 3a and 3b is believed to lie in the minimization of impediments to free radial movement of the piston head relative to the assembled support. Specifically, the improved pressure head is pressure-balanced and does not have any tightly-compressed elastomeric seals between those facing surfaces of the support and piston which are arranged to slide radially relative to one another. In the first predecessor device shown in FIGS. 1a and 1b, the nominal pressure differential (i.e., $P_2 - P_1$) across the piston head exerted a force which drove the piston head left face 144 hard against support surface 35'. The magnitude of this force increased with the magnitude of such pressure differential. While there were no face seals in this first embodiment, such pressure differential created a substantial frictional force between contacting surfaces 35',44. In the second embodiment shown in FIGS. 2a and 2b, the piston head was pressure-balanced. Hence, the nominal pressure differential (i.e., $P_2 - P_1$) across the piston head, did not drive the piston head left face 76 hard against support surface 73'. However, what was gained by pressure-balancing the piston head was more than lost by providing face seals 75,75' between the piston head and the support. These O-rings had to be tightly compressed to insure the fluid-tight sealing integrity of the seals. At the same time, such compression of these O-rings exerted substantial frictional forces which tended to impede free radial movement of the piston head relative to the support. As Applicant's data illustrates, the performance of the second predecessor embodiment having face seals (even though the piston head was pressure-balanced) was substantially worse than the performance of the first predecessor embodiment which, while not pressure-balanced, did not have face seals engaging the end faces of the piston head.

Of course, the invention contemplates that many changes and modifications may be made. For example, whereas the seal-receiving grooves are shown as being provided in the support parts, these grooves could alternatively be provided in the piston head such that the seals would engage the piston head, with the device redimensioned accordingly. The materials of construction are not deemed critical, and may be readily changed or varied. Surfaces 124,131 need not necessarily be of the same diameter. The first and second passageways may be provided through the piston head, as shown, or might alternatively be provided through the support and/or the actuator rod, as desired.

Therefore, while a preferred embodiment of the improved piston-and-cylinder arrangement has been shown and described, and certain modifications and changes thereof discussed, persons skilled in this art will readily appreciate that various additional changes and modifications may be made without departing from the spirit of the invention, as defined and differentiated by the following claims.

What is claimed is:

1. In a piston-and-cylinder arrangement having an annular piston head member encircling a portion of an actuator rod member, said piston head member being mounted on said rod member portion for movement axially therewith and radially relative thereto, said piston head member having one end face adapted to be exposed to a first fluid pressure and having an opposite end face adapted to be exposed to a second fluid pressure, the improvement which comprises:

an annular recess provided in one of said members to face the other of said members, said one member having a first surface provided to one side of said recess, having a second surface provided within said recess, and having a third surface provided to the other side of said recess;

an annular lug provided on the other of said members and arranged in said recess, said other member having a first surface provided to one side of said lug and arranged to face said one member first surface, having a second surface provided on said lug and arranged to face said one member second surface, and having a third surface provided to the other side of said lug and arranged to face said one member third surface;

a first seal ring operatively arranged to seal the joint between said first surface;

a second seal ring operatively arranged to seal the joint between said second surfaces;

a third seal ring operatively arranged to seal the joint between said third surfaces;

a first passageway arranged to communicate said second fluid pressure with the annular space between said first and second seal rings;

a second passageway arranged to communicate said first fluid pressure with the annular space between said second and third seal rings;

said first, second and third surfaces being so configured and dimensioned that a fluid pressure acting on either end face of said piston head member will not urge said piston head member to move axially relative to said rod member;

whereby frictional forces opposing radial movement of said piston head member relative to said rod member, will be reduced.

2. The improvement as set forth in claim 1 wherein each of said first, second and third surfaces is cylindrical.

3. The improvement as set forth in claim 1 wherein said one member has a fourth surface joining said one member first and second surfaces.

4. The improvement as set forth in claim 3 wherein said one member fourth surface is arranged in a radial plane.

5. The improvement as set forth in claim 1 wherein said one member has a fifth surface joining said one member second and third surfaces.

6. The improvement as set forth in claim 5 wherein said one member fifth surface is arranged in a radial plane.

7. The improvement as set forth in claim 1 wherein said other member has a fourth surface joining said other member first and second surfaces.

8. The improvement as set forth in claim 7 wherein said other member fourth surface is arranged in a radial plane.

9. The improvement as set forth in claim 1 wherein said other member has a fifth surface joining said other member second and third surfaces.

10. The improvement as set forth in claim 9 wherein said other member fifth surface is arranged in a radial plane.

11. The improvement as set forth in claim 1 wherein said portion is a marginal end portion of said actuator rod member.

12. The improvement as set forth in claim 1 wherein said one member is said actuator rod member and said other member is said piston head member.

13. The improvement as set forth in claim 12 wherein said piston head member first surface joins said one end face.

14. The improvement as set forth in claim 12 wherein said piston head member third surface joins said opposite end face.

15. The improvement as set forth in claim 1 and further comprising a first groove extending into one of said members from its first surface, and wherein said first seal ring is received in said first groove and sealingly engages the first surface of the other member.

16. The improvement as set forth in claim 15 wherein said first groove extends into said actuator rod member.

17. The improvement as set forth in claim 1 and further comprising a second groove extending into one of said members from its second surface and wherein said second seal ring is received in said second groove and sealingly engages the second surface of the other member.

18. The improvement as set forth in claim 17 wherein said second groove extends into said rod member.

19. The improvement as set forth in claim 1 and further comprising a third groove extending into one of said members from its third surface, and wherein said third seal ring is received in said third groove and sealingly engages the third surface of the other member.

20. The improvement as set forth in claim 19 wherein said third groove extends into said rod member.

21. The improvement as set forth in claim 1 wherein said first passageway is provided in said piston head member.

22. The improvement as set forth in claim 1 wherein said second passageway is provided in said piston head member.

23. The improvement as set forth in claim 1 wherein said piston head member has an outer surface of diameter $D_3$ arranged to slidably engage said cylinder, wherein said piston head member first and third surfaces are each of diameter $D_2$, wherein said piston head member second surface is of diameter $D_1$, and wherein the relationship between said piston head member first, second and third surfaces is expressed by the equation:

$$D_2^2 = (D_3^2 + D_1^2)/2.$$

* * * * *